(12) United States Patent
Stefanov et al.

(10) Patent No.: US 7,401,963 B2
(45) Date of Patent: Jul. 22, 2008

(54) LIGHT MODULE WITH REARSIDE INTRODUCTION OF LIGHT FOR SIMULATION AND/OR AS SUPPLEMENT OF CONVENTIONAL LIGHT PIPING RODS

(75) Inventors: Emil Stefanov, Esslingen (DE); Andreas Erber, Esslingen (DE); Otto Müller, Gruibingen (DE)

(73) Assignee: odelo GmbH, Schwaikheim (DE)

( * ) Notice: Subject to any disclaimer, the term of this patent is extended or adjusted under 35 U.S.C. 154(b) by 211 days.

(21) Appl. No.: 11/315,620

(22) Filed: Dec. 22, 2005

(65) Prior Publication Data
US 2006/0164855 A1    Jul. 27, 2006

(30) Foreign Application Priority Data
Dec. 22, 2004    (DE) ................ 10 2004 063 111

(51) Int. Cl.
*F21V 7/04* (2006.01)
(52) U.S. Cl. .................. 362/620; 362/626; 362/551
(58) Field of Classification Search ............... 362/620, 362/626, 328, 334, 337, 339, 349

See application file for complete search history.

(56) References Cited

U.S. PATENT DOCUMENTS

| | | | | |
|---|---|---|---|---|
| 5,165,772 A | * | 11/1992 | Wu | 362/26 |
| 6,097,549 A | * | 8/2000 | Jenkins et al. | 359/726 |
| 7,021,805 B2 | * | 4/2006 | Amano et al. | 362/518 |

FOREIGN PATENT DOCUMENTS

EP    1 167 869 A2    1/2002

* cited by examiner

*Primary Examiner*—Ali Alavi
(74) *Attorney, Agent, or Firm*—Reising Ethington Barnes Kisselle P.C.

(57) ABSTRACT

A light assembly disperses light emitted by a light source. The lighting assembly includes a light entry surface for receiving the light emitted by the light source. A direction surface directs the light in a predetermined direction. A stepped region, disposed adjacent the light entry surface receives the light directed by the direction surface and reflects the light. The stepped region includes a plurality of step parts, each defining a light deflection surface, wherein each of the light deflection surfaces is greater in area s step distance between the light deflection surface and the direction surface increases.

21 Claims, 4 Drawing Sheets

LIGHT MODULE WITH REARSIDE INTRODUCTION OF LIGHT FOR SIMULATION AND/OR AS SUPPLEMENT OF CONVENTIONAL LIGHT PIPING RODS

FIELD OF THE INVENTION

The invention relates to a lighting assembly with at least one light source and at least one optical waveguide element. More particularly, the invention relates to a lighting assembly having an optical waveguide element, optically connected after the light source, with light deflection surfaces arranged staggered and directly or indirectly illuminated by the light source.

DESCRIPTION OF THE RELATED ART

A known lighting assembly is disclosed in European patent EP 1 167 869 A2. The optical waveguide element is a wedge-like component, whose point faces away from the light source. The two wedge surfaces, one of which is a reflection surface and the other a light outlet surface, have a regular structure. The light outlet surface has additional optics, in order to achieve the desired optical impression. The configuration of the light outlet surface is therefore dependent on the desired optical effect.

The problem with this configuration is the inability to generate a homogeneously distributed output light, whose light output surface can be configured, for the most part, freely.

SUMMARY OF THE INVENTION

A light assembly disperses light emitted by a light source. The lighting assembly includes a light entry surface for receiving the light emitted by the light source. A direction surface directs the light in a predetermined direction. A stepped region, disposed adjacent the light entry surface receives the light directed by the direction surface and reflects the light. The stepped region includes a plurality of step parts, each defining a light deflection surface having a length equal to the length of each of the other of the light deflection surfaces, wherein each of the light deflection surfaces is greater in area as step distance between the light deflection surface and the direction surface increases.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
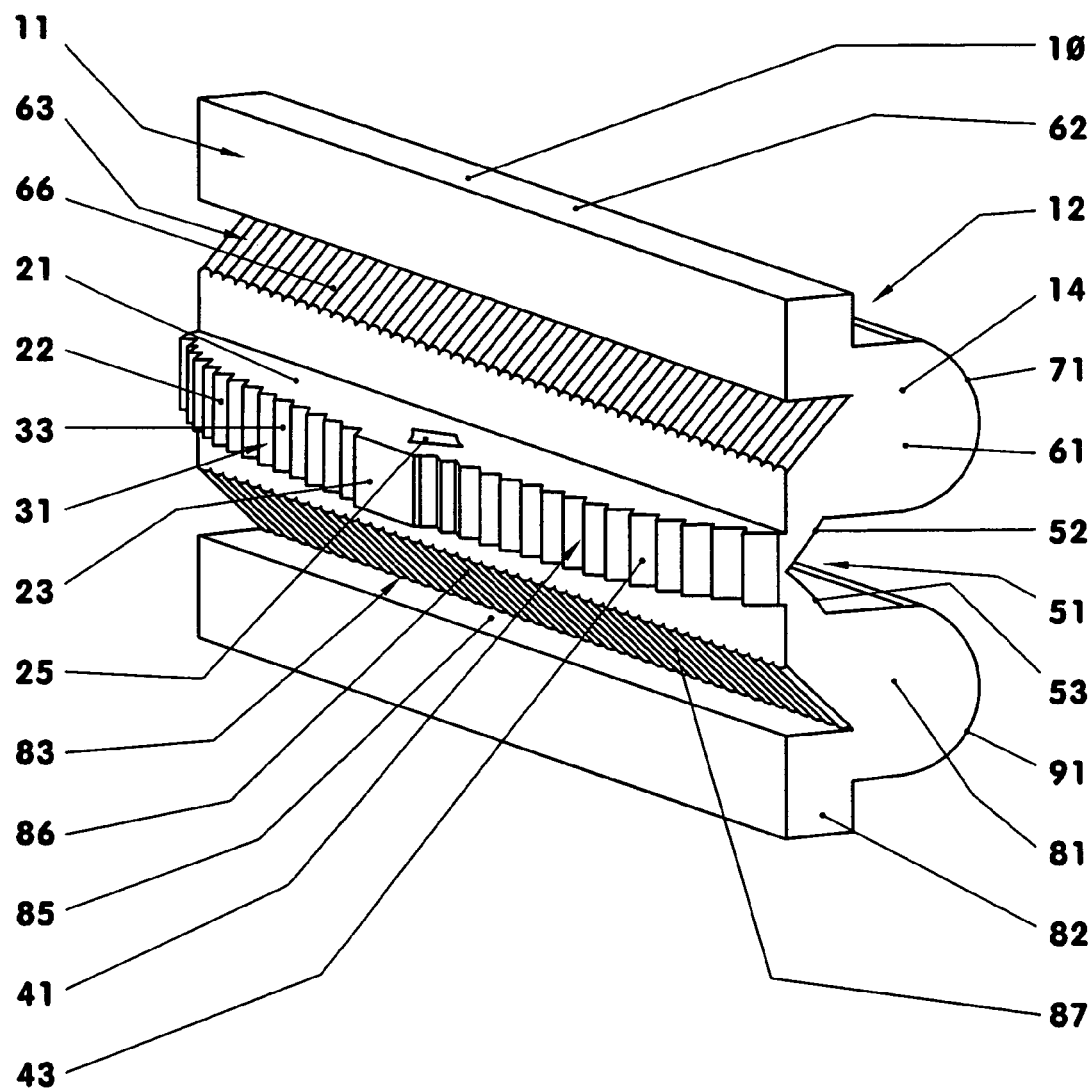
FIG. 1 is a perspective view of one embodiment of the invention.
Figure 2:
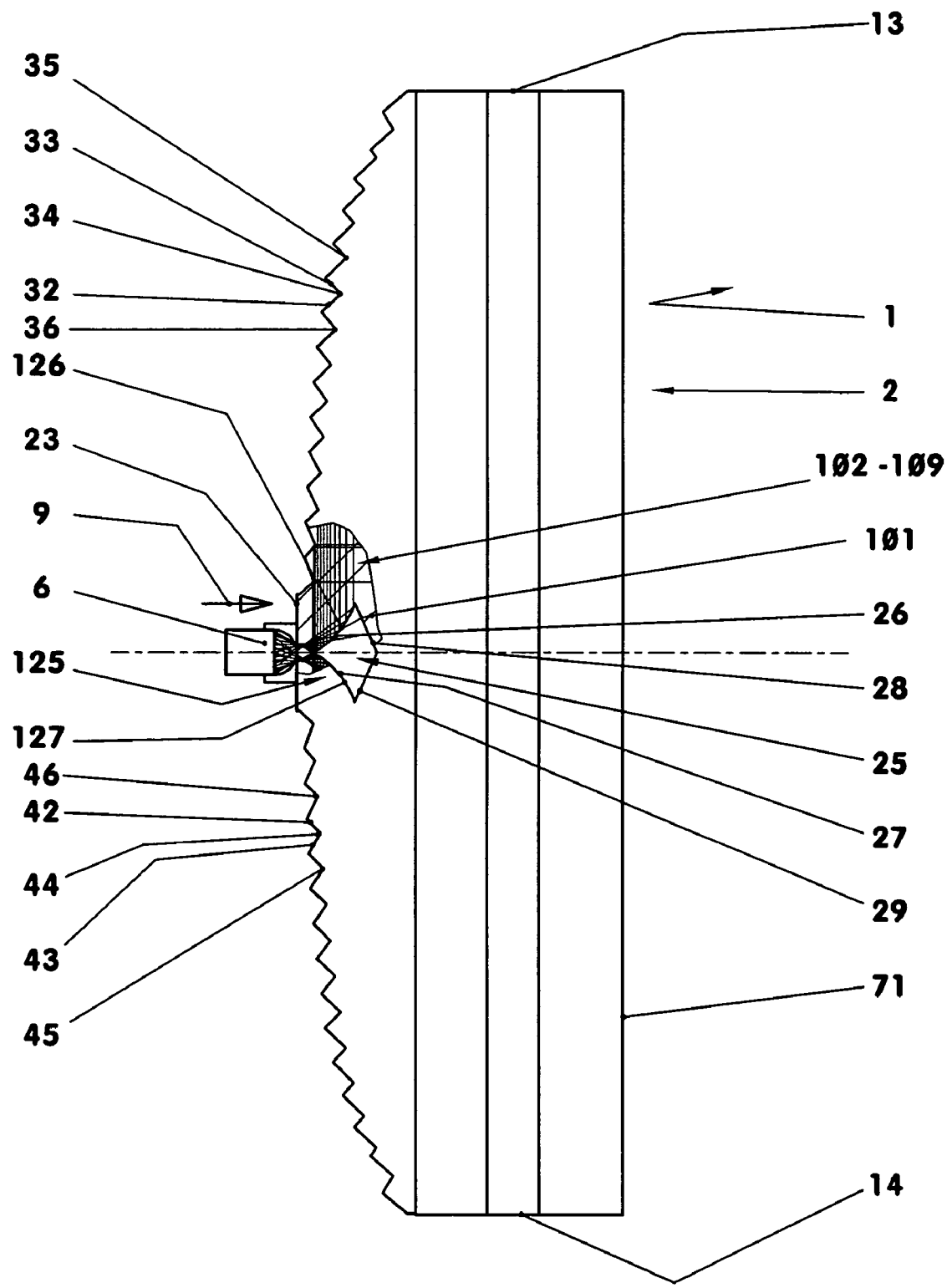
FIG. 2 is a top view, partially cut away, a the invention according to FIG. 1 with a light source secured thereto.
Figure 3:
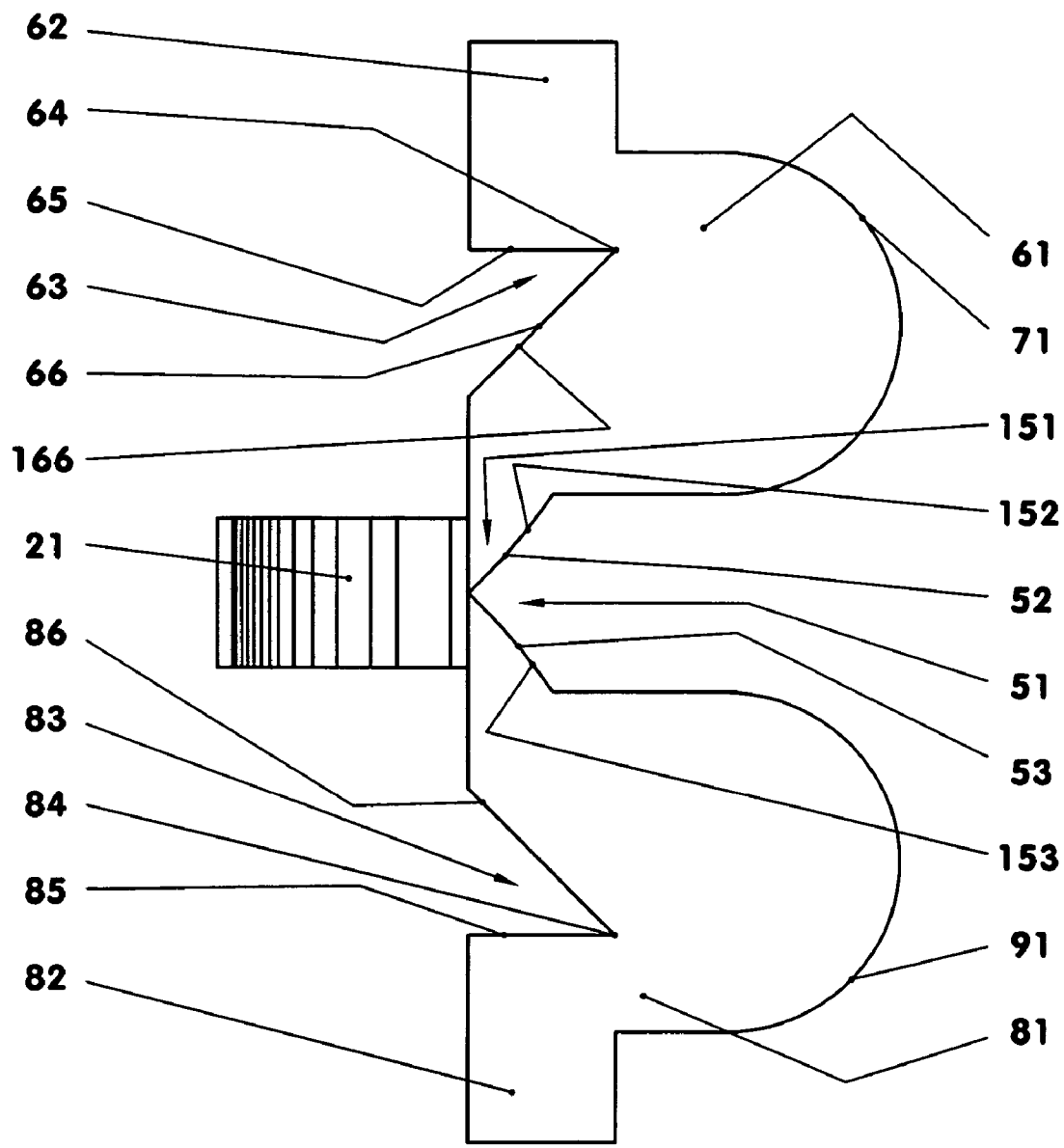
FIG. 3 is a side view of the invention according to FIG. 1.

FIG. 2 shows the top view of a lighting assembly 2, for example, a rear lamp of a vehicle. The lighting assembly 2 includes a light source 6 and an optical waveguide element 10 optically connected with the light source 6. The light source 6, which may be a light-emitting diode, an incandescent lamp, a halogen lamp, and the like, can be mounted on the optical waveguide element 10, molded into it, clipped in, etc. FIGS. 1 and 3 show the optical waveguide element 10 with the light source 6. FIG. 1 shows a perspective view of a back side 11 and FIG. 3 represents a side view of the optical waveguide element 10. The lighting assembly 2 can be designed in one or several parts.

With the lighting assembly 2 incorporated in a vehicle (not shown here), the light source 6 is situated, for example, within the vehicle on the back side 11 of the optical waveguide element 10. From outside of the vehicle, for example, two light outlet surfaces 71, 91 of the lighting assembly 2 are visible, which delimit the vehicle contour. These light outlet surfaces 71, 91 are arranged on the front 12 of the optical waveguide element 10.

The lighting assembly 2 is axi-symmetric about a horizontal central longitudinal plane and a vertical central transverse plane through the light source 6, respectively. These two above-mentioned planes intersect in an imaginary line through the light source 6 oriented in the direction of radiation 9.

The optical waveguide element 10, for example, is a one-piece, transparent plastic element, for example, made of PMMA, modified PMMI, etc. It consists of a light distributor 21, an upper light outlet unit 61 and a lower light outlet unit 81. Its length, in the practical example depicted in FIGS. 1-3, is four times its depth and 2.4 times its height.

The light distributor 21 is a crescent-shaped component and defines a curved path. In the practical example, it is precisely as long as the optical waveguide element 10. Its depth is about 11% of its length, its height about 6% of the length. A light entry surface 23 lies in the rear outside surface 22, symmetric to the vertical central transverse plane. This is a quadratic flat surface, whose edge length corresponds to the height of the light distributor 21.

On both sides of light entry surface 23, the outer surface 22 consists of a stepped region 31; 41, which connects the light entry surface 23 to the corresponding face 13, 14.

The individual steps 32, 33; 42, 43 of the stepped region 31; 41 consist of step surfaces 32; 42 and rear surfaces 33; 43 adjacent to them. Each of the plurality of step surfaces 32, 42 define a step distance as that distance between each step surface 32, 42 and the light entry surface 23. The step surfaces 32, 42 are interfaces of the light distributor 21 relative to the surroundings 1. The individual step surfaces 32; 42 lie roughly parallel to each other and are normal to the horizontal central longitudinal plane of the lighting assembly. They form an angle of 45 degrees, for example, with the vertical central transverse plane. The step surfaces 32; 42 can also form a different angle with these planes.

Each step surface 32; 42 and one of the two rear surfaces 33; 43 adjacent to it form an angle of ninety degrees with each other in the depiction of FIG. 2. This enclosed angle can also be more acute or more obtuse. The crest level 34; 44, which is shown as a vertex in the top view of FIG. 2, is the crest line of a concave notch.

The distance of the individual crest levels 34; 44 relative to each other is not constant within the corresponding step regions 31; 41. The distance of any crest level 34; 44 to a crest level 35; 45 that is farther away from the light entry surface 23, is smaller than the distance to a crest level 36; 46 that lies closer to the light entry surface 23. The distance of two adjacent crest levels 34, 35; 34, 36; 44, 45; 44, 46 is smaller, the farther these crest levels 34, 35; 34, 36; 44, 45; 44, 46 are from the light entry surface 23.

The light distributor 21 has a recess 25 with a square cross-section, which is symmetric to the vertical central transverse plane. The length of the short diagonals of the recess 25, for example, is 44%, the length of the long diagonals 80% of the depth of the light distributor 21. The distance of this recess 25 from the light entry surface 23, for example, is one-fifth of the depth of the light distributor 21. The cross-section of the recess 25 can taper, for example, in the direction of the horizontal central longitudinal plane.

The boundary surfaces 26, 27 of recess 25 lying closer to the light entry surface 23 may be sections or portions of the surfaces of a cylinder, an ellipsoid, a paraboloid, a cone, and the like. If the boundary surfaces 26, 27 are sections of a cylinder or cone surface, the base surface of the cylinder or cone can be circular, elliptical, oval, etc. The base surface can also be bounded by an arbitrarily curved, continuous or non-continuous three-dimensional curve, for example, by a parabola. It is also conceivable to make these boundary surfaces 26, 27 plane surfaces.

The boundary surfaces 28, 29 of recess 25 that are farther away from the light entry surface 23 can be plane surfaces, sections of surfaces of a cylinder, an ellipsoid, a paraboloid, a cone, etc.

The light distributor 21 has an at least roughly V-shaped notch 51 oriented in the longitudinal direction of optical waveguide element 10 on the front 12, whose central plane coincides with the horizontal central longitudinal plane of lighting assembly 2. The notch surfaces 52, 53 are the surface sections of a cylindrical surface, in which the cylinder has a base surface that is circular, elliptical, oval, etc., or is bounded by a closed, continuously or discontinuously curved three-dimensional curve. Optionally, the notch surfaces 52, 53 can also be flat surfaces or consist of individual continuous or discontinuously curved flat surface elements. The notch angle enclosed by the two notch surfaces 52, 53, for example, is less than 100 degrees.

The two light output units 61, 81 are arranged symmetric to the horizontal central longitudinal plane of the lighting assembly 2. Their length corresponds in the practical example to the length of the optical waveguide element 10, their depth is about two-thirds the depth of the optical waveguide element 10.

On the back 11, each light output unit 61, 81 has a triangular longitudinal notch 63, 83 over its entire length, whose depth is roughly 20% of the depth of the optical waveguide element 10. The crest lines 64, 84 of longitudinal notches 63, 83 lie here at one-third the height of the optical waveguide element 10, offset to the horizontal central longitudinal plane. The notch angle of longitudinal notches 63, 83, for example, is forty-six degrees. The boundary surfaces 65, 85 of longitudinal notches 63, 83 separated from the horizontal central longitudinal plane are flat surfaces that lie parallel to the horizontal central longitudinal plane.

Figure 5:
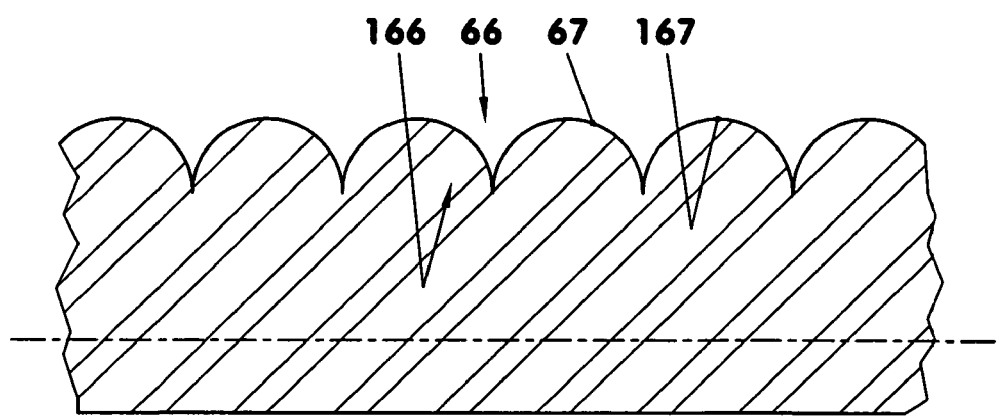
FIG. 5 is an enlarged top view, partially cut away, of a deflection-reflector used in the invention.

The boundary surfaces 66, 86 of longitudinal notches 63, 83 lying closer to the horizontal central longitudinal plane consist of individual surface elements 67, 87. These surface elements 67, 87 are surface sections of an outward arched cylinder, as shown in FIGS. 1 and 5. They lie parallel to each other, in which the axes of the cylinders are oriented across the longitudinal direction of the optical waveguide element 10 and their length corresponds to the width of the corresponding boundary surface 66, 86. The surface elements 67, 87 can also be surface sections of ellipsoids, paraboloids, etc. They can be arched convexly or concavely. The axes of these surface elements can also lie obliquely to the longitudinal direction of optical waveguide element 10.

The light outlet surfaces 71, 91 are sections of cylindrical surfaces. The corresponding cylinders, which lie parallel to the horizontal central longitudinal plane, have the length of the optical waveguide element 10 and an oval cross-section. They are offset by one-fourth the height of the optical waveguide element 10 relative to the horizontal central longitudinal plane. The height of the light outlet surfaces 71, 91, for example, corresponds roughly to one-third the height of the optical waveguide element 10. Optical lenses can be arranged on the light outlet surfaces 71, 91.

For fastening in the vehicle, the optical waveguide element 10 has an upper 62 and a lower fastening flange 82. These fastening flanges 62, 82 are parts of the upper 61 or lower light outlet unit 81.

During production of the lighting assembly 2, the optical waveguide element 10 is produced, for example, in an injection molding method. In this case, the light-emitting diode 6, or parts thereof, can be molded therein. The optical waveguide element 10 becomes largely homogeneous because of this production method. Individual regions of the surface of the optical waveguide element 10 can be mirrored.

For incorporation in a vehicle, the lighting assembly 2, for example, is fastened with the upper 62 and lower fastening flange 82 in the vehicle body and the light source 6 electrically connected. A diaphragm (not shown here) optionally lies between the light outlet surfaces 71, 91. The incorporation dimensions of the lighting assembly 2 in the vehicle are essentially determined by the dimensions of the optical waveguide element 10. The incorporation length of the lighting assembly 2 therefore corresponds to the length of the optical waveguide element 10 and the incorporation height corresponds to the height of the optical waveguide element 10. The incorporation depth (see FIG. 2) is determined by the depth of the optical waveguide element 10 and the light source 6.

In a lighting assembly 2 that is switched off, the light outlet surfaces 71, 91 are visible from outside of the vehicle. They appear as uniform surfaces of homogeneous color.

During operation of the lighting assembly 2, the light 101-109 emitted from light source 6 in radiation direction 9 passes through the light entry surface 23 into the light distributor 21 of optical waveguide element 10. In the light distributor 21, the light 101-109 impinges on the interfaces of recess 25, which are formed by the boundary surfaces 26, 27. These interfaces are light deflection and refraction surfaces 126, 127 for the impinging light 101-109.

Light 101, which impinges on the surfaces 126, 127 at an angle to the normal, which is smaller than the boundary angle of total reflection—in an optical waveguide element made of PMMA, this angle is forty-three degrees, for example—passes with refraction through the light deflection and refraction surface 126, 129 into recess 25. Part of this light 101 (with refraction again) enters the optical waveguide element 10 through the boundary surfaces 28, 29.

The light 102-109 that impinges at an angle on the light deflection and refraction surfaces 126, 127, which is greater than the material-specific boundary angle, is reflected on these surfaces 126, 127.

The two light deflection and refraction surfaces 126, 127, arranged symmetric to each other, form a light divider 125. When it impinges on the light divider 125, the light 102-109 is deflected, both into the half of the light distributor 21 depicted on the top in FIG. 2, and into the half of the light divider 21 depicted on the bottom of the same figure. The reflected, diverging light 102-109 in FIGS. 2 and 4 is shown as a parallel light bundle 102-109 for simplicity.

The two light reflectors 126, 127 of light divider 125 are indirect light sources for one-half of the light distributor 21. The reflected light 102-109 in light distributor 21 is guided in the direction of the step surfaces 32, 42, cf. FIG. 4.

Figure 4:
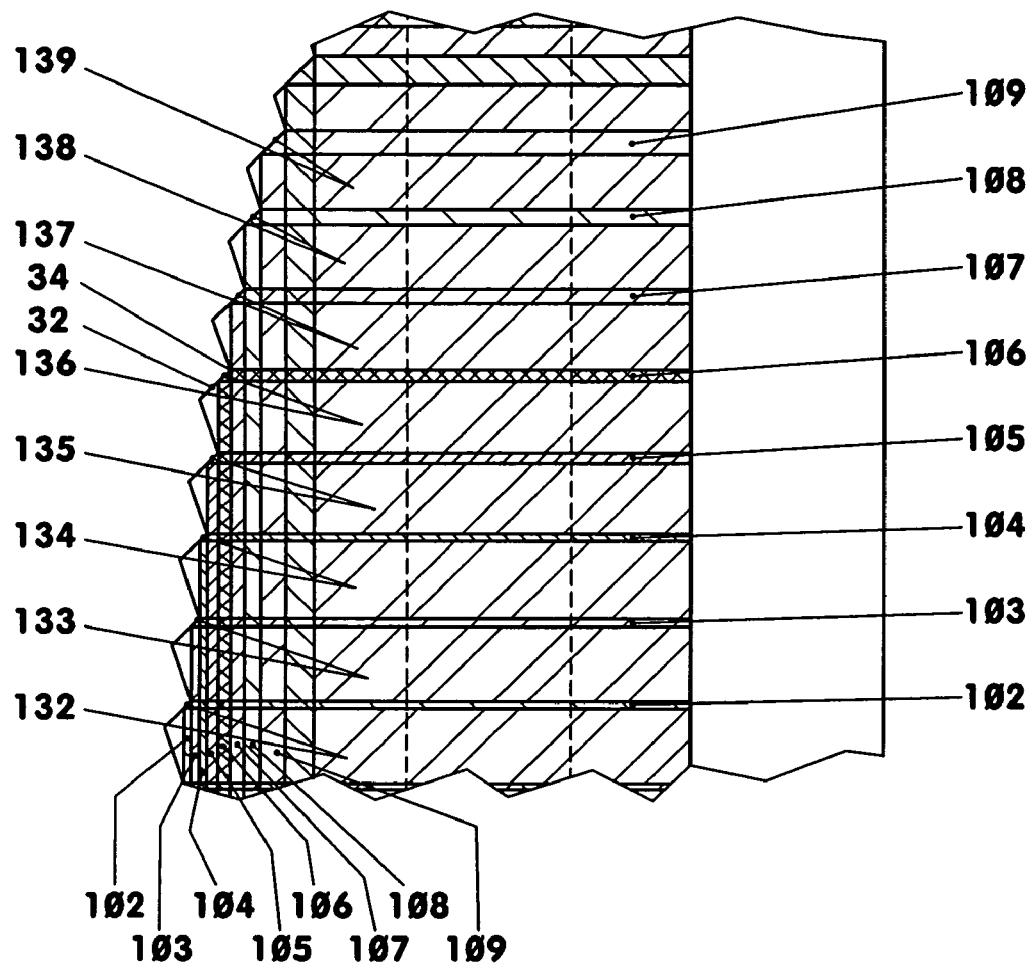
FIG. 4 is an enlargement of the step region of the invention with light represented as passing therethrough.

FIG. 4 shows a detail of the light deflection region depicted in the upper half of FIG. 2. At the corresponding interfaces 32, 42, only a section bordering the crest levels 34; 44 is illuminated. This corresponding section is a light deflection surface 132-139. These light deflection surfaces 132-139 are arranged in a staggered manner, in which of the depicted light deflection surfaces 132-139, the light deflection surface 132 having the smallest step distance has the smallest distance to light reflector 126 and the light deflection surface 139 having the largest step distance is farthest from the light reflector 126. When the light source 6 is switched on, the part 102 of light 102-109 illuminates the light deflection surface 132, the light part 103 illuminates the light deflection surface 133, etc. The individual regions of light 102-109 lie right next to each other on leaving the light reflector 126. The interfaces formed by the rear surfaces 33, 43 are free surfaces.

The farther the individual light deflection surfaces 132-139 are from light reflector 126, the farther they extend into the light distributor 21 (rightward in FIG. 4. The amount by which a light deflection surface 133-139 lying away from light reflector 126 extends farther into light distributor 21 than the next closer light deflection surface 132-138 is not constant. This amount increases with distance of the light deflection surfaces 132-139 to light reflector 126. Consequently, at least with roughly parallel light deflection surfaces 132-139, the area of a light deflection surface 132-139 lying at greater distance is greater than the area of the next closer light deflection surface 132-139.

The light 105 that illuminates the light deflection surface 135, for example, is reflected rightward on this light deflection surface 135 in the depiction of FIG. 4. A light band 105 that is wider than the adjacent light band 104 is produced. The light intensity reflected on light deflection surface 135 is therefore greater than the light intensity deflected on light deflection surface 134. At the same time, this light band 105 is narrower than the light band 106 that is reflected on light deflection surface 136. A smaller light intensity is also deflected on the light deflection surface 135 than on the light deflection surface 136. The partial light fluxes of the deflected light bundle are therefore at least roughly equal.

The light 107 that lies next to light part 106, on leaving the light reflector 126 in the depiction of FIGS. 2 and 4 on the right, is tangent to the light deflection surface 136 at its crest line 34 and illuminates the next farther light deflection surface 137. The light part 106, in turn, which illuminates the light deflection surface 136, is tangent to the light deflection surface 135. The entire reflected light 102-109 therefore impinges on light deflection surface 132-139.

The light 102-109 impinging on the light deflection surfaces 132-139 has a different light intensity, among other things, because of absorption of the material. The farther distant light deflection surfaces 132-139 are thus illuminated with lower light intensity or illumination intensity than the closer lying light deflection surfaces 132-139.

The center lines of the individual light deflection surfaces 132-139 have at least roughly the same distance to each other and are parallel to each other in this practical example. The staggering of light deflection surfaces 132-139, the distance of the individual crest levels 34, 35; 34, 36 relative to each other, diminishes with increasing distance of the light deflection surface 132-139 from light reflector 126.

The light deflection surfaces 132-139 can also consist of several individual surfaces.

The light bundle 102-109 reflected on the light deflection surfaces 132-139 is largely homogeneous, since the lower light intensity in the sections distant from the light reflector 126, 127 is compensated by a larger light deflection surface 132-139.

The homogeneously distributed light 101-109 impinges on the interfaces of the optical waveguide element 10, formed by the notch surfaces 52, 53. The two interfaces enclose the complementary angle of the V-shaped notch 51 of 360 degrees, i.e., at least an angle of 260 degrees. They form a deflection-light divider 151, whose imaginary plane of symmetry is aligned normal to the imaginary plane of symmetry of the light divider 125. The deflection-light distributor 151 has two reflection surfaces 152, 153, on which the impinging light 101-109 is deflected upward and downward in the depiction of FIGS. 1 and 3. By arching of the reflection surfaces 152, 153, the light reflected on them 101-109 is bundled. Optionally, the surfaces 152, 153 can have scattering optics that scatter the light 101-109 in the longitudinal direction of the optical waveguide element 10. The reflection surfaces 152, 153 of the deflection-like distributor 151 and/or the light deflection surfaces 130-140 can have scattering optics 166.

The light 101-109 reflected on the deflection-light divider 151 impinges on the interfaces of the optical waveguide element 10, which are formed by the boundary surfaces 66, 86 of the longitudinal notches 63, 83. The surface elements 67, 87 form segmented total reflection optics 166, which deflect the impinging light 101-109 in the direction of the light outlet surfaces 71, 91. The light 101-109 here is fanned out in the longitudinal direction of the optical waveguide element 10 by means of the semi-cylindrical reflection elements 167, depicted in FIG. 5. The reflection elements 167 can also be sections of cylindrical segments, whose segment angle is smaller than 180 degrees. The base surface of the cylinder can also be bounded by a parabolic section, an elliptical section, etc. The optical axis of the reflection elements 167 depicted here can also form an angle not equal to ninety degrees with the longitudinal axis of the optical waveguide element 10.

The light bundle 102-109 reflected and widened in this way passes into the surroundings 1 through light outlet surfaces 71, 91. The imaginary axes of the light outlet surfaces 71, 91, for example, are parallel to the imaginary plane of symmetry of the deflection-light divider 151.

During operation of lighting assembly 2, the light outlet surfaces 71, 91 appear as homogenously illuminated surfaces. The light outlet surfaces 71, 91 can therefore be freely configured in producing lighting assembly 2 and can be adapted to the auto body of the vehicle and, for example, follow its external contour. The light outlet surfaces 71, 91 appear as surfaces, for example, optically smooth.

The lighting assembly 2 can be constructed non-symmetrically. The light deflection surfaces 132-139 can be illuminated directly by light source 6. The lighting assembly 2 can also have several light sources 6 and/or several optical waveguide elements 10.

Only limited incorporation space is required for the lighting assembly 2 in the vehicle. By arranging the light source 6 on the back side 11, the lighting assembly 2 can be incorporated flush on the side. For example, several lighting assemblies 2 can be arranged next to each other and two parallel, uninterrupted, long, homogenously illuminating light bands can be produced. The arrangement of several lighting assemblies 2, one above the other, is also conceivable.

In the depiction of FIGS. 1 to 3, the radiation direction 9 lies normal to an imaginary tangential plane of the two light outlet surfaces 71, 91. The light source 6 can also be arranged, so that the radiation direction 9 forms an acute solid angle with the tangential plane.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. A lighting assembly (2) for dispersing light emitted by a light source (6), said lighting assembly (2) comprising:
    a light entry surface (23) for receiving the light emitted by the light source (6);
    a direction surface (126) for directing the light in a predetermined direction; and
    a stepped region (31) disposed adjacent said light entry surface (23) for receiving the light directed in the predetermined direction and for reflecting the light, said stepped region (31) including a plurality of step parts (32) each defining a light deflection surface having a length equal to said length of each other of said light deflection surfaces, wherein each of said light deflection surfaces (132-139) is greater in area as step distance between said step part and said direction surface (126) increases.

2. A lighting assembly (2) as set forth in claim 1 wherein said plurality of step parts (32) are configured sequentially.

3. A lighting assembly (2) as set forth in claim 2 wherein said step region (31) defines a curved path.

4. A lighting assembly (2) as set forth in claim 3 including a light-deflection divider (151) disposed adjacent said step region (31) for collecting and dividing the light received thereby.

5. A lighting assembly (2) as set forth in claim 4 wherein said light-deflection divider (151) defines a notch (51) defining notch surfaces (52, 53).

6. A lighting assembly (2) as set forth in claim 5 wherein each of said notch surfaces (52, 53) define a curved plane.

7. A lighting assembly (2) as set forth in claim 6 including a total reflection optics surface (166) for reflecting the light divided by said notch (51).

8. A lighting assembly (2) as set forth in claim 7 wherein said total reflection optics surface (166) includes a plurality of surface sections (167).

9. A lighting assembly (2) as set forth in claim 8 wherein each of said surface sections (167) are cylindrical in shape and parallel to each other.

10. A lighting assembly (2) as set forth in claim 9 including a light outlet surface (71) for emitting the light out from said lighting assembly (2).

11. A lighting assembly for dispersing light emitted by a light source, said lighting assembly comprising:
    a light entry surface for receiving the light emitted by the light source;
    a direction surface for directing the light in a predetermined direction; and
    a plurality of step parts for receiving the light directed in the predetermined direction and for reflecting the light, each of said plurality of step parts defining a light deflection surface and a crest at which said light deflection surface terminates, each of said crests defining a crest distance between said crest and a preceding one of said crests, whereby said crest distance decreases as said crest is further from said direction surface.

12. A lighting assembly (2) as set forth in claim 11 including a plurality of boundary surfaces (26, 27), each of said boundary surfaces (26, 27) separating and directing the light toward each of said plurality of step parts.

13. A lighting assembly (2) as set forth in claim 12 wherein said plurality of step parts (32) are configured sequentially.

14. A lighting assembly (2) as set forth in claim 13 said plurality of step parts extend through a curved path.

15. A lighting assembly (2) as set forth in claim 14 including a light-deflection divider (151) disposed adjacent said plurality of step parts for collecting and dividing the light received thereby.

16. A lighting assembly (2) as set forth in claim 15 wherein said light-deflection divider (151) defines a notch (51) defining notch surfaces (52, 53).

17. A lighting assembly (2) as set forth in claim 16 wherein each of said notch surfaces (52, 53) define a curved plane.

18. A lighting assembly (2) as set forth in claim 17 including a total reflection optics surface (166) for reflecting the light divided by said notch (51).

19. A lighting assembly (2) as set forth in claim 18 wherein said total reflection optics surface (166) includes a plurality of surface sections (167).

20. A lighting assembly (2) as set forth in claim 19 wherein each of said surface sections (167) are cylindrical in shape and parallel to each other.

21. A lighting assembly (2) as set forth in claim 20 including a light outlet surface (71) for emitting the light out from said lighting assembly (2).

* * * * *